Figures 1, 6:
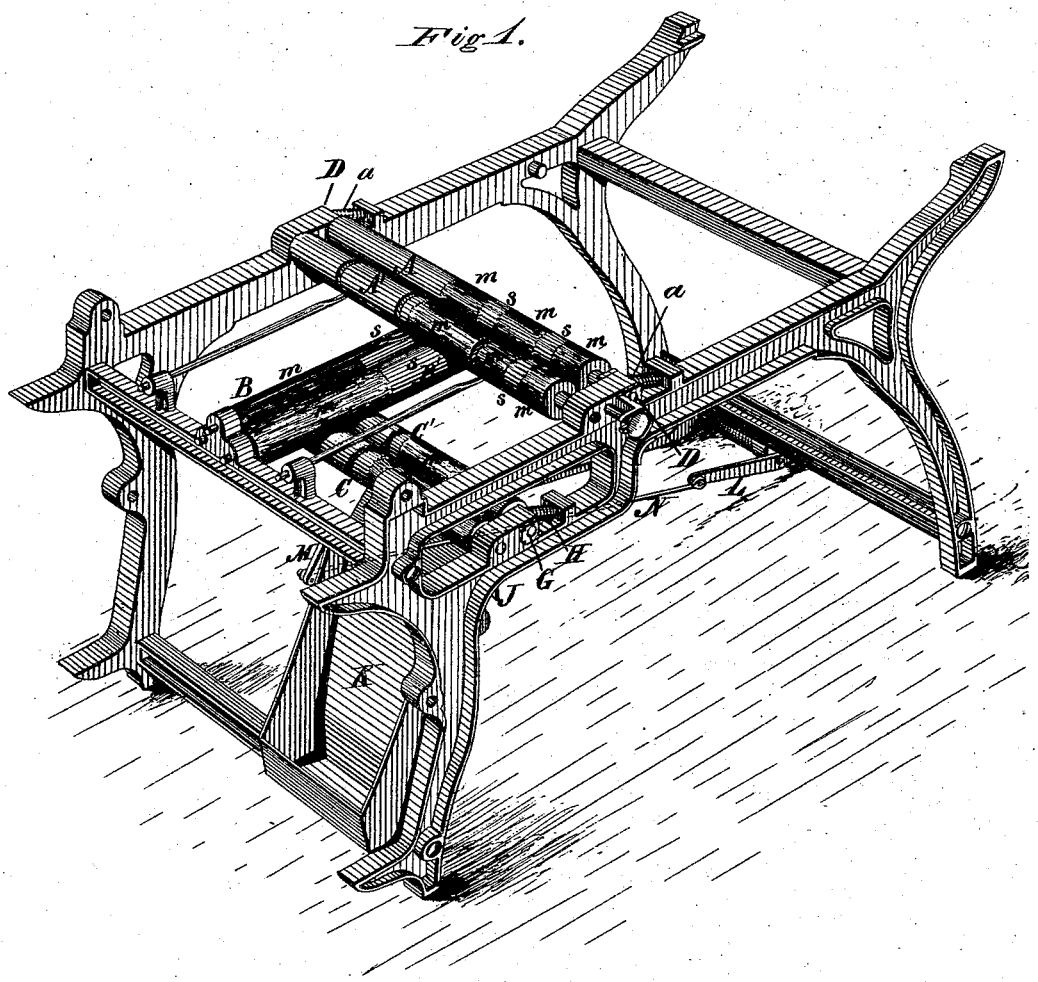

2 Sheets--Sheet 1.

C. CHAMBERS, Jr.
Paper-Folding Machines.

No. 156,982. Patented Nov. 17, 1874.

Witnesses.
Harry King.
Wm. R. Stansbury

Inventor.
Cyrus Chambers, Jr.
By his Attorneys,
Stansbury & Munn

2 Sheets--Sheet 2.
C. CHAMBERS, Jr.
Paper-Folding Machines.
No. 156,982. Patented Nov. 17, 1874.
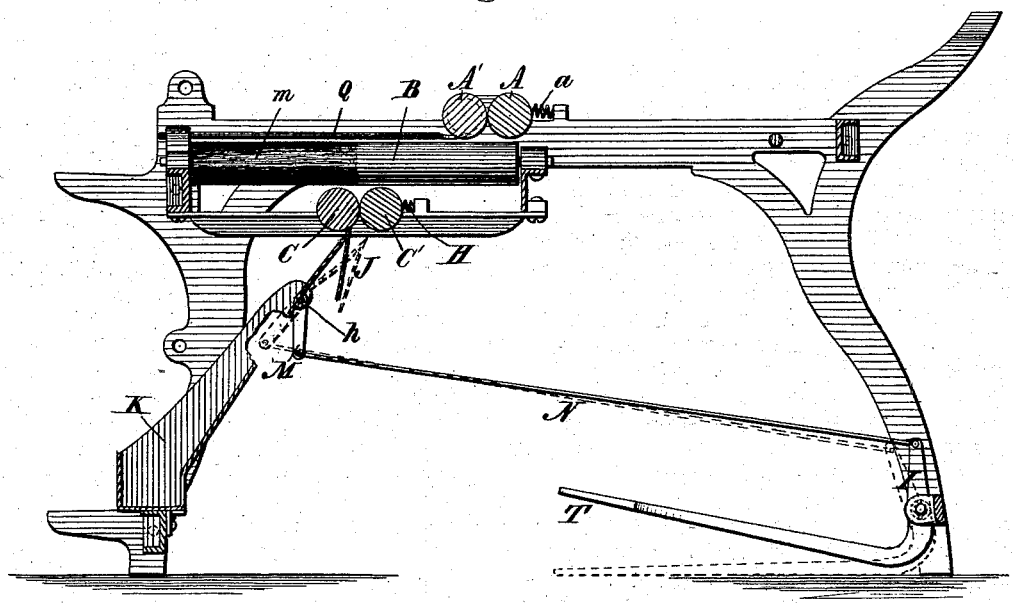
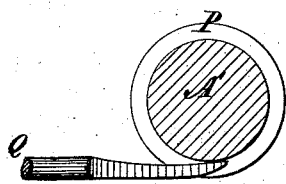
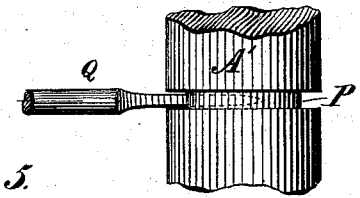
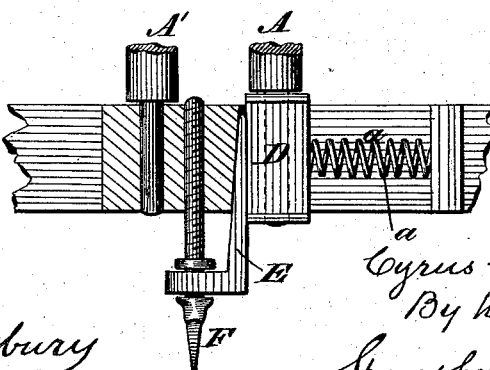
Witnesses.
Harry King
Wm R. Stansbury
Inventor:
Cyrus Chambers, Jr.
By his Attorneys,
Stansbury & Munn.

UNITED STATES PATENT OFFICE.

CYRUS CHAMBERS, JR., OF PHILADELPHIA, PENNSYLVANIA.

IMPROVEMENT IN PAPER-FOLDING MACHINES.

Specification forming part of Letters Patent No. 156,982, dated November 17, 1874; application filed January 21, 1874.

*To all whom it may concern:*

Be it known that I, CYRUS CHAMBERS, Jr., of the city of Philadelphia, in the State of Pennsylvania, have invented certain new and useful Improvements in Paper-Folding Machines; and I do hereby declare the following to be a full and correct description of the same, reference being had to the accompanying drawings, in which—

Figure 1 is a perspective view of part of a paper-folding machine with my improvements introduced. Fig. 2 is a longitudinal vertical section of the same; and Figs. 3, 4, 5, and 6 are details on an enlarged scale.

The same part is marked by the same letter of reference wherever it occurs.

My improvements relate to the construction and adjustment of the rollers of folding-machines to the mechanism for throwing out an imperfect sheet before it reaches the packing-box, and to the construction of the guiding-bars, and of the grooved rollers in which their ends are received, all as hereinafter fully set forth.

In my original machines I made the folding-rollers of wood, and secured the requisite friction between them and the sheet of paper by covering them with felt or other suitable cloth. This covering was liable to wear, and to change its condition of elasticity and the character of its surface. In the machines made under the present improvement, the rollers are of iron, first polished smooth, and then milled with a finely-polished milling-wheel, which raises fine ridges upon their surfaces, slightly indenting the surface of the rollers between the raised ridges, thus leaving a fine waved surface on the roller, as shown in Fig. 6, that takes hold of the paper, and yet, as the surfaces of the ridges are smooth and polished, will not take up ink from dry printed sheets.

I find that this construction answers the purpose perfectly, and is more economical and lasting than the covered wooden rollers. If, however, the milling is continued upon those parts of the rollers against which the carrying-tapes run, these are rapidly worn out. I therefore omit the milling or ridges on those parts of one or both of the rollers which come in contact with the tapes, leaving them perfectly smooth at those places, thus obviating the only objection to the use of the milled roller. In machines for book-work, I omit the milling on the roller around which the tapes run at the line of the tape, and mill the other one, in order to insure its seizing smooth dry paper, but on machines for newspaper-work, the paper to be folded being soft and damp, I omit the milling on both rollers at the line where the tapes run.

In the drawings, three pairs of rollers, A A', B B', and C C', are shown. The milled portions of these rollers are marked $m$, and the portions turned smooth are marked $s$. The journal-boxes D of the first roller A are made adjustable, to regulate the distance between the first pair, so that their exact initial or normal position can be so fixed that the pressure of the spring shall not force the rollers together so as to bind or crush the tapes. The device for this purpose is clearly shown in Fig. 5. A spring, $a$, reacts against one side of the journal-box D, so as to press the rollers together, while allowing roller A to yield in the opposite direction. On the opposite side of the box D is a wedge, E, which, as it is driven in by the screw F, forces the box D back against the spring $a$, thus perfectly controlling the position of roller A relatively to roller A', for the purpose before stated. The boxes of the last rollers C C' are so arranged as to strike a permanent stop, so placed as to prevent the rollers from coming into contact and wearing off the milling. The sliding box G and spring H allow them to separate in yielding to the thickness of the folded sheets while pressing the folds tightly together.

To secure the certain delivery of the defective or badly-folded sheets to the waste-box, I hinge at $h$ a vibrating piece, J, to the upper edge of the waste-box K, underneath the last pair C C' of folding-rollers. The movements of this vibrating deflector J are controlled by the treadle T, near the foot of the operator, by means of levers L M and connecting-rod N. When the folded sheets are to fall into the packing-trough, (not shown,) the parts are in the position shown in full lines in Fig. 2; but when it is desired to throw out a bad or imperfectly-folded sheet, the treadle T is depressed by the operator, and the deflector J thrown into the position shown in dotted lines in Fig. 2, so as to deflect the sheet and guide it into the waste-box K, instead of allowing it to fall directly into the packing-trough and be packed among the perfect sheets. The packing-trough is not shown, as it is made and operates in the manner described and represented in my previous patents for folding-machines.

In my folding-machines as formerly made, the grooves P, for the reception of the supporting bars or rods Q, were made larger than the average diameter of the bars or rods. The ends of the rods which entered the grooves were equal in thickness to the other parts of the rods. This made the grooves necessarily wide, which allowed the paper to wrinkle, and left too much space uncreased by the folding-rollers. To obviate this defect I now reduce the end of the bar or rod Q (see Figs. 3 and 4) to a thin edge, and cut a very narrow groove, P, in the roller to receive it. This reduces the space for wrinkling to a minimum, and gives the crease to nearly the whole width of the folded sheet.

Having thus described my improvements, what I claim, and desire to secure by Letters Patent, is—

1. Milled folding-machine rollers, having those portions against which the conveying-tapes run made smooth, as and for the purpose specified.

2. The combination of the roller journal-box D, spring $a$, and an adjustable stop, E, for the purpose set forth.

3. The combination of the sliding box G, spring H, and a permanent stop, in the manner and for the purpose described.

4. The vibrating wedge-shaped deflector J, arranged as described in relation to the waste-box and packing-trough, and to the last pair of folding-rollers, and operated in the manner and for the purpose specified.

5. The combination of the tapered rods or bars Q with the narrow grooves P in the folding-rollers, to receive their tapered ends, as described.

The above specification of my said invention signed and witnessed at Philadelphia this the 26th day of December, A. D. 1873.

CYRUS CHAMBERS, JR.

Witnesses:
MORIS CHAMBERS,
THORWALD CHR. DAMBORG.